US007080400B1

(12) United States Patent
Navar (10) Patent No.: US 7,080,400 B1
(45) Date of Patent: Jul. 18, 2006

(54) SYSTEM AND METHOD FOR DISTRIBUTED STORAGE AND PRESENTATION OF MULTIMEDIA IN A CABLE NETWORK ENVIRONMENT

(76) Inventor: Murgesh S. Navar, 732 Brandermill Ct, San Jose, CA (US) 95138

( * ) Notice: Subject to any disclaimer, the term of this patent is extended or adjusted under 35 U.S.C. 154(b) by 1272 days.

(21) Appl. No.: 09/927,665

(22) Filed: Aug. 6, 2001

(51) Int. Cl.
- H04N 7/173 (2006.01)
- H04N 7/16 (2006.01)
- G06F 15/16 (2006.01)

(52) U.S. Cl. .................. 725/139; 725/86; 725/91; 725/129; 709/219

(58) Field of Classification Search ............ 725/91–92, 725/95, 103, 119, 129, 139, 109–110, 112, 725/86, 10; 709/239, 240, 243, 244, 201, 709/203, 213, 214, 217, 219; 370/432, 473, 370/474, 486, 536–537
See application file for complete search history.

(56) References Cited

U.S. PATENT DOCUMENTS

| | | | |
|---|---|---|---|
| 4,506,387 A | 3/1985 | Walter | 455/612 |
| 5,130,792 A | 7/1992 | Tindell et al. | 358/85 |
| 5,133,079 A | 7/1992 | Ballantyne et al. | 455/4.1 |
| 5,790,806 A | 8/1998 | Koperda | 395/200.82 |
| 5,841,468 A | 11/1998 | Wright | 348/6 |
| 6,041,056 A | 3/2000 | Bigham et al. | 370/395 |
| 6,144,702 A | 11/2000 | Yurt et al. | 375/240.01 |
| 6,161,011 A | 12/2000 | Loveless | 455/426 |
| 6,181,716 B1 | 1/2001 | Lide | 370/519 |

(Continued)

OTHER PUBLICATIONS

Bound book. pp. 1-6, Product Bulletin, No. 1287 from website: http://www.cisco.com/warp/public/cc/pd/iosw/iore/iomjre121/prodlit/1287_pb.htm. Downloaded Jun. 14, 2001. pp. 1-4, Cable DOCSIS 1.1 FAQs from website: http://www.cisco.com/warp/public/109/cable_faq_docsisll.html. Downloaded Jun. 14, 2001. 1 page, Appendix B—RF Specifications, printed Jun. 17, 2001. 5 pages, from Verisky's files: Cable architecture / HFC Pictures. 1 page (numbered p. 4), entitled: The Need for a Smarter Metro Edge, Source: Aberdeen Group, Jan. 2001.

(Continued)

*Primary Examiner*—Hai Tran
*Assistant Examiner*—Son P. Huynh
(74) *Attorney, Agent, or Firm*—T. Lester Wallace (57) ABSTRACT

A method and apparatus for distributing multimedia content (such as video, games, music, pictures), where the multimedia content is stored in a plurality of set-top boxes that are connected to a cable network. A controller unit located at a central cable station manages the multimedia content. The multimedia content stored in the set-top boxes is made available to any set-top box on request to the controller in the central cable station. The controller unit also interfaces with a plurality of multimedia owners, many situated on the Internet, to source the multimedia content and to source service properties associated with the multimedia content. The controller unit informs the content owners and appropriate billing systems when a multimedia content has been delivered to a remote set-top box and has been consumed by an end user. The end user accesses the multimedia content through a television, a personal computer, or other multimedia appliance.

21 Claims, 7 Drawing Sheets

U.S. PATENT DOCUMENTS

| | | | |
|---|---|---|---|
| 6,185,224 B1 | 2/2001 | Limb et al. | 370/459 |
| 6,211,901 B1 | 4/2001 | Imajima et al. | 725/93 |
| 6,230,203 B1 | 5/2001 | Koperda et al. | 709/229 |
| 6,233,389 B1 | 5/2001 | Barton et al. | 386/46 |
| 6,236,653 B1 | 5/2001 | Dalton et al. | 370/352 |
| 6,240,553 B1 | 5/2001 | Son et al. | 725/95 |
| 6,449,688 B1* | 9/2002 | Peters et al. | 711/112 |
| 6,449,730 B1* | 9/2002 | Mann et al. | 714/6 |
| 6,519,693 B1* | 2/2003 | Debey | 712/201 |
| 2001/0036271 A1* | 11/2001 | Javed | 380/217 |
| 2002/0078174 A1* | 6/2002 | Sim et al. | 709/219 |

OTHER PUBLICATIONS

Subscriber Networks, Explorer 8000 Home Media Server, 1 page downloaded Aug. 2001.

Informational Internet-Draft by Howard Abramson, "IP over Cable Data Network (IPCDN)," 28 pages, Docsis1.1-IGMP-MIB, Mar. 2001.

Data-Over-Cable Service Interface Specifications, Radio Frequency Interface Specification, SP-RFIv1.1-I06-001215, Interim Specification. Cover page, pp. ii-xvii and pp. 1-432. Date: Dec. 15, 2000.

Data-Over-Cable Service Interface Specifications, Operations Support System Interface Specification, SP-OSSlv1.1-I03-001220, Interim Specification. Cover page, pp. ii-iii, and pp. 2-182. Date: Dec. 20, 2000.

PacketCable Dynamic Quality-of-Service Specification, PKT-SP-DQOS-I02-000818, Interim. Cover page, pp. ii-viii and pp. 1-203. Date: Aug. 18, 2000.

* cited by examiner

```xml
<?XML version="1.0" encoding="UTF-8"?>
<!-- This sample document describes an XML document used to distribute -->
<!-- movies to a cable subscriber audience. The content provider and the -->
<!-- network operator collaborate in the development of this document, -->
<!-- describing the terms on which the movie is distributed on the network. -->
<!-- When start of service is requested through this document, the controller -->
<!-- unit in the central cable station will process the movie as per the terms -->
<!-- described in this document. The terms indicate modes of distribution, -->
<!-- priority, time frames of validity, bandwidth and storage requirements, -->
<!-- target subscriber base, charges for viewing the movie, etc. -->
<!-- Service Property Database -->
<!DOCTYPE Video on Request "movie.dtd">
<VideoStore>
<MovieServiceName> CasaBlanca </ MovieServiceName>
<MediaInfo>
    <MovieGenre MovieType="Classic"/>
    <EncodingInfo> MPEG2 </EncodingInfo>
    <FileSize> 2GB </FileSize>
</MediaInfo>
<DistributionInfo>
    <Devices DeviceType="TVSet-TopBox"/>
    <Audience AudienceType="Family"/>
    <PreRelease>
        <PreReleaseInterval>1 Week</PreReleaseInterval>
        <PreReleaseRegion="Western"/>
    </PreRelease>
    <Priority PriorityLevel = "B"/>
</DistributionInfo>
<PeriodInfo>
    <PeriodName> Summer </PeriodName>
    <TimeInfo>
        <StartDate> 06/30/2001 </StartDate>
        <EndDate> 09/30/2001 </EndDate>
    </TimeInfo>
    <ViewingValid ViewValidity="4 Days"/>
</PeriodInfo>
<PaymentInfo>
    <PayeeName> Warner Brothers </PayeeName>
    <PayerName> Subscriber </PayerName>
    <NetworkOperator NetOpSplit="45%"/>
    <Billing Info Typeof Billing="PerView"/>
    <BillingInfo ChargePerView= "4.00"/>
    <Discount WeekdayDiscount="25%"/>
</PaymentInfo>
</VideoStore>
```

```
<?XML version="1.0" encoding="UTF-8"?>
<! - This sample document describes an XML document used to carry Billing service <! -
messages transported over a bi-directional persistant TCP/IP socket using -- >
<! - HTTP headers to Billing systems developed by other vendors. - ->
<! - The terms for Billing indicate the movie watched, time of day, amount charges - ->
<! - and the sharing ratios of the revenue between the content owner and the - ->
<! - network operator. -->

<! –Billing Messages -->
<!DOCTYPE Billing Info "billing.dtd">
<Bill Info>
<ServiceName> CasaBlanca </ ServiceName>
<PeriodInfo>
    <PeriodName> Summer </PeriodName>
    <TimeInfo>
        <Date> 06/30/2001 </Date>
        <Time> 18:30 </Time>
    </TimeInfo>
</PeriodInfo>
<PaymentInfo>
    <Charge "4.00"/>
    <Payee1> Warner Brothers </Payee1>
    <Payee2> Network Operator </Payee2>
    <PayerName> Jon Smith </PayerName>
    <Account Number "12234 "/>
    <IPADDR IP=192.168.1.100/>
    <Payee1 Ratio="60%"/>
    <Payee2 Ratio= "40%"/>
</PaymentInfo>
</Bill Info>
```

SYSTEM AND METHOD FOR DISTRIBUTED STORAGE AND PRESENTATION OF MULTIMEDIA IN A CABLE NETWORK ENVIRONMENT

TECHNICAL FIELD

The present invention relates to a multimedia service distribution system. More specifically, the present invention relates to a method and apparatus for providing video delivery service over a cable data network. The system of the present invention utilizes a controller unit located at a central cable station. The controller unit in the central cable station is connected to plurality of cable modems located in remote buildings (homes), through a two-way Hybrid Fiber Coax cable network. The present invention further relates to an architecture that enables multimedia service providers and the cable network operators to collaborate in the delivery of the service to a plurality of televisions, personal computers, residential gateways or other appliances connected to a cable data network.

BACKGROUND INFORMATION

Figure 1:
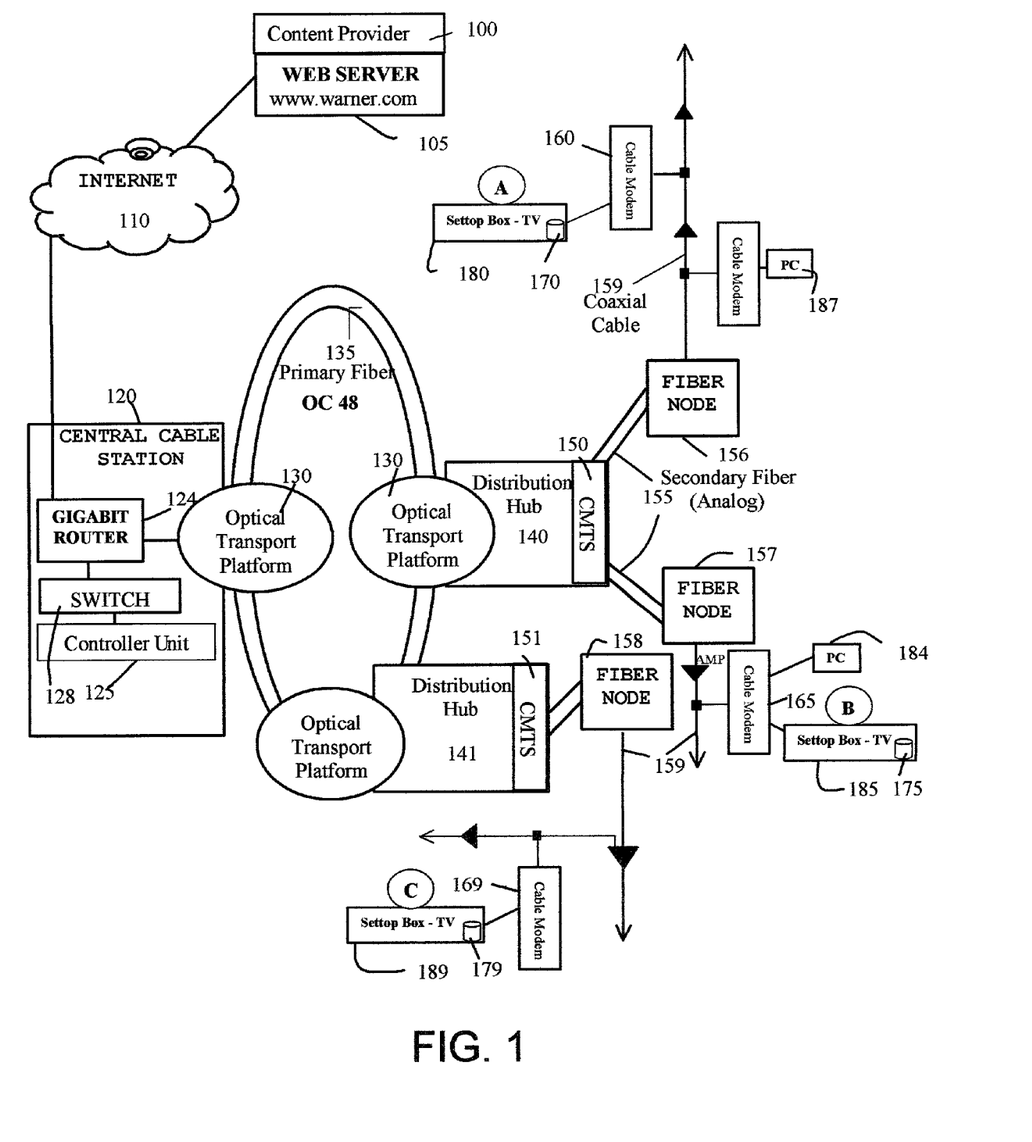
FIG. 1 provides a overview block diagram of the entire content distribution chain over the HFC cable data network from the content owner website hosted on the Internet to the cable connected TV set-top boxes and Personal Computers in the home

The Cable Networks were originally built to support analog broadcast television services, in which programs are transmitted to all subscribers at the same time. These cable networks of the past were implemented in a system architecture known as "trunk and feeder". The function of the trunk coaxial cable is to deliver broadband television signals from a central cable station to a plurality of distribution points. The distribution points are connected to feeder coaxial cables, which emanate from the trunk coaxial cable and contain subscriber tap off devices. In recent years, this primarily one-way analog broadcast cable networks have been significantly re-designed and upgraded through the use of optical fibers. Optical fibers have intrinsically more information carrying capacity than coaxial cables and less susceptible to electro magnetic interference (EMI). The newer optical cable based networks are intended to support high-speed digital two-way data services. One widely used cable data network architecture shown in FIG. 1 is known as Hybrid Fiber Coax (hereinafter referred to as HFC). The two directions of data flow consists of data traveling from the Cable Modem Termination System (hereinafter referred to as CMTS) 150 towards a cable modem 160 in a remote building, referred to as downstream and data traveling from a cable modem 160 towards the CMTS 150, referred to as upstream.

The HFC cable plant connects a plurality of personal computers and TV set-top boxes located in remote buildings (homes) to one another as well as to a variety of network devices and multimedia content providers. A personal computer 184 or the TV set-top box 185 is connected to the cable network via a cable modem 165 interface. The HFC cable plant consists of a central cable station 120, which contains a switch 128 for accessing multiple networks and a gateway router 124 for external communication links to the open Internet. The central cable station connects to a plurality of distribution hubs 140,145 via primary fiber optic cable 135. A distribution hub 140 contains one or more radio frequency (RF) modulators for transmitting information to, and one or more radio frequency (RF) demodulators for receiving information from, a plurality of cable modems 160,165,169 located in remote buildings. Connecting a distribution hub 140 with the subscribers in remote buildings is a secondary fiber optic cable 155 and coaxial cable 159 system. On larger HFC cable plants, the central cable station 120 may be further decomposed into a "main head-end" and "regional head-end". On smaller HFC cable plants, the central cable station and distribution hub may be combined into a single location, referred to herein as "central cable station".

The transmission spectrum in a typical HFC cable plant consists of a forward path with a RF frequency range of 54–750 megahertz (MHz) and return path with a RF frequency range of 5–42 MHz. In the cable plant, each broadcast signal is allocated to a channel in the transmission spectrum. In the United States the cable television systems use National Television Standards Committee (NTSC) standard, which allocates six (6) MHz to each channel. A typical HFC system reserves 54 MHz to 550 MHz of the transmission spectrum for broadcast analog channels. That leaves about 200 MHz (550 MHz–750 MHz) or approximately thirty three (33) 6 MHz channels for digital services, hereafter called the digital spectrum. Using quantized amplitude modulation—QAM64 technique, each 6 MHz channel can carry 27 Mbits/sec of information on the forward path. MPEG-2 is the standard for carrying digital services. MPEG-2 Transport is a standard for formatting and packetizing the compressed audio and video information and for transporting other data. The digital data stream from the cable operator is disassembled in the subscriber premises by the TV set-top box to find programs in the multiplexed signal. An MPEG-2 transport multiplex supports multiple programs in the same broadcast channel. MPEG-encoded packets can be output in a variety of data rates. For example, the MPEG-2 compression standard is able to encode a video program to a 3.85 Mbits/sec bit stream and packetize up to seven (7) 3.85 Mbits/sec bit streams into a single 27 Mbits/sec transport stream, i.e. on a single 6 MHz channel.

There are three forms of digital video services currently delivered over a typical HFC network to a subscriber television, through a TV set-top box. The digital spectrum is used for digital broadcast television programming, Near Video on Demand (NVOD) and Real Time Video on Demand (RT-VOD). In addition to carrying audio and video packets the MPEG2 transport carries data. On a HFC cable network, typically one 6 MHz channel is reserved to carry Internet Protocol (IP) data downstream. The Internet Protocol (IP) data flows from the Internet 110 though the central cable station 120, through the CMTS 150 to the cable modems 160,165,169 located in remote buildings and then onto the attached personal computer 184,187 or a television set-top box 180,185,189. The downstream available bandwidth for IP data on a 6 MHz slot is 27 Mbits/sec. This bandwidth of 27 Mbits/sec is typically shared by about 400 cable modems located in remote buildings (homes). The available upstream bandwidth for the same 400 homes is in the range of 3 Mbits/sec to 9 Mbites/sec. Therefore, typical available upstream bandwidth is 3 to 10 times smaller than the typical available downstream bandwidth. Thus the HFC network is an asymmetrical network with more limited upstream bandwidth that needs to be carefully managed in comparison to the downstream bandwidth.

Standardization efforts on the HFC network, its components, and the services that run on the network, are underway. CableLabs®, is a research and development consortium of cable television system operators representing North and South America. CableLabs is leading several initiatives aimed at developing interoperable interface specifications for delivering advanced multimedia services over two-way cable plant. The Data Over Cable Systems Interface Specification (DOCSIS) Radio Frequency Interface Specification describes a standard for the interface between the CMTS 150 and a cable modem 160. The DOCSIS 1.1 Radio Frequency Interface Specification and the Packet Cable Dynamic Quality-of-Service Specification details Quality of Service guarantees over a HFC network. The various DOCSIS protocol mechanisms described in the said specifications can be used to support Quality of Service (hereinafter referred to as QoS) for both upstream and downstream traffic through the cable modem 160 and the CMTS 150. Quality of Service (QoS) is a measure of performance for a transmission system that reflects its transmission quality and service availability. Key parameters include Bandwidth, indicating at least a specified bit rate, Latency, indicating the delay between request and a subsequent response and Jitter, indicating the delay between packets. Other QoS parameter encodings include Traffic Priority, Maximum Sustained Traffic Rate, Minimum Reserved Traffic Rate.

Scheduling services are designed to improve the efficiency of the poll/grant process. By specifying a scheduling service and its associated QoS parameters, the CMTS 150 can anticipate the throughput and latency needs of the traffic and provide polls and/or grants at the appropriate times. Each service is tailored to a specific type of data flow. The basic services comprise: Unsolicited Grant Service (UGS), Real-Time Polling Service (rtPS), Unsolicited Grant Service with Activity Detection (UGS-AD), Non-Real-Time Polling Service (nrtpS) and Best Effort (BE) service.

Dynamic Service Flow is a key feature of DOCSIS 1.1 QoS. The dynamic creation, modification, and deletion of service flows allows for on-demand reservation of network bandwidth resources between the CMTS 150 and the TV set-top box 185 or a personal computer 184 in the home. The principal mechanism for providing enhanced QoS is to classify packets traversing the radio frequency (RF) Media Access Control interface into a Service Flow. A Service Flow is a unidirectional flow of packets that is provided a particular Quality of Service. The cable modem 165 and Cable Modem Termination System 150 provide QoS by shaping, policing, and prioritizing traffic according to the QoS Parameter Set defined for the Service Flow. Service Flows exist in both the upstream and downstream direction, and may exist without actually being activated to carry traffic. Service Flows have a 32-bit Service Flow Identifier (SFID) assigned by the CMTS 150. All Service Flows have an SFID; active and admitted upstream Service Flows also have a 14-bit Service Identifier (SID). Incoming packets are matched to a Classifier that determines to which QoS Service Flow the packet is forwarded. The Classifier can examine the IP header of the packet. If the packet matches one of the Classifiers, it is forwarded to the Service Flow indicated by the SFID attribute of the Classifier.

Service Flows are created by the Dynamic Service Addition process (DSA). The Dynamic Service Addition (DSA) may be initiated by either the cable modem (referred to as CM herein) 165 or the CMTS 150, and may create one upstream and/or one downstream dynamic Service Flow(s). A CM 165 wishing to create an upstream and/or a downstream Service Flow sends a request to the CMTS 150 using a dynamic service addition request message (DSA-REQ). The CMTS checks the CM's authorization for the requested service(s) and whether the QoS requirements can be supported and generates an appropriate response using a dynamic service addition response message (DSA-RSP). The CM 165 concludes the transaction with an acknowledgment message (DSA-ACK).

A CM 165 that needs to change a Service Flow definition performs the following operations. The CM 165 informs the CMTS 150 using a Dynamic Service Change Request message (DSC-REQ). The CMTS 150 will decide if the referenced Service Flow can support this modification. The CMTS 150 will respond with a Dynamic Service Change Response (DSC-RSP) indicating acceptance or rejection. The CM 165 reconfigures the Service Flow if appropriate, and then will respond with a Dynamic Service Change Acknowledge (DSC-ACK).

A CM 165 wishing to delete an upstream and/or a downstream Service Flow generates a delete request to the CMTS 150 using a Dynamic Service Deletion-Request message (DSD-REQ). The CMTS 150 removes the Service Flow(s) and generates a response using a Dynamic Service Deletion-Response message (DSD-RSP). Only one upstream and/or one downstream Service Flow can be deleted per DSD-Request.

Using the afore mentioned service flow controls, the cable operator can provide special QoS to the cable modem dynamically for the video download session, as opposed to the static provisioning and reservation of resources at the time of cable modem registration. This provides a more efficient use of the available bandwidth.

Cable operators desire to use the increased bandwidth and flexibility on the HFC networks to provide narrowcast services. Narrowcast indicates specifically tailored, custom delivery of a service to a single subscriber or to a group of similar subscribers. The system used to narrowcast a video service is called Video-On-Demand (hereinafter referred to as VOD).

Typically movies and other videos of interest are digitally encoded prior to offering on a VOD system. On cable systems the content for VOD is encoded according to the various Motion Picture Experts Group (MPEG) standards. The latest standard known as MPEG-4 refers to ISO/IEC designated standard 14496, which is incorporated herein by reference in its entirety. Previous MPEG standards popular in use today are MPEG-1, referring to ISO/IEC designated standard 11172 and MPEG-2, referring to ISO/IEC designated standard 13818, both of these standards are incorporated herein by reference in their entirety.

There are three primary flavors of VOD being deployed to digital television viewers over cable networks.

One flavor is referred to as Near Video on Demand (hereinafter referred to as NVOD), wherein a single program such as a movie is broadcast at predetermined time intervals on many channels simultaneously, but staggered by 20 minutes or so from the previous channel. This guarantees a subscriber that wishes to watch the movie over NVOD, that one is available for purchase and viewing within 20 minutes at any time. If the length of a movie is 140 minutes, to achieve the guarantee of availability of the movie within 20 minutes, the cable network operator broadcasts the same movie over seven (7) separate streams. Encoded at 3.85 Mbits/sec, this single movie will occupy a 6 MHz channel or 27 Mbits/sec. On a typical HFC cable system there are a total of only 33 channels each of six (6) MHz available to all digital services. If all of the digital spectrum were allocated to NVOD, the maximum number of unique movies that can be supported by NVOD in the above example is only 33. NVOD uses up precious bandwidth (spectrum). The cable operator expects to find groups of interested and paying subscribers to be watching each stream of the staggered movie. This may not happen. The NVOD system does not provide the user control over the movie once the show has started. The user cannot pause, fast-forward or rewind the movie. The drawbacks of NVOD are thus obvious.

The second flavor of Video-on-Demand involves automatically recording the broadcast television programming onto a storage device such as a hard disk in the TV set-top box. The subscriber is able to retrieve the recorded programming at a later time and view it with complete control over the program including pause, fast-forward or rewind functionality. A TV set-top box capable of recording and playback is called Digital Video Recorder (hereinafter referred to as DVR). However, the subscriber is limited by the size of the hard disk into how much programming is available on demand. Furthermore, the user needs to select, ahead of time, programs of interest for recording against the broadcast programming schedule. Combining NVOD with DVR gives additional flexibility and control for NVOD subscribers. Given the limited broadcast spectrum, it is highly likely that only the most popular programming will find space on the broadcast schedule. Thus it is apparent, that the limited amount of accessible content is a major drawback.

The third flavor of VOD is the Real-Time VOD (hereinafter referred to as RT-VOD) system. RT-VOD system, an embodiment of which is the Media Hawk VOD system by Concurrent corporation, consists of at least one video server including a video data storage device and a streaming unit reading the video data from the video storage device to perform a video streaming process on the video data. Through a RT-VOD service a subscriber can request and watch a desired video program. The subscriber selects the desired title from a plurality of titles provided by the RT-VOD service. At the request of the subscriber, the requested video is played immediately. The subscriber has full control over the video program, to pause, fast-forward or rewind the video while it is playing. The RT-VOD system can be thought of as a DVR located in the cable network, instead of in the subscriber premises. The said RT-VOD system is shared by a plurality of subscribers. The central RT-VOD system is typically located at the distribution hub 140 of a HFC network. However unlike NVOD, a single stream of the video is meant for a single subscriber and uses the same bandwidth (spectrum) as the single NVOD stream. In the NVOD system, the cable operator expects to find a group of paying subscribers watching the instance of a movie at the same time. In the RT-VOD system, only a single subscriber pays for the same bandwidth. Therefore RT-VOD is very expensive as measured against the limited bandwidth between the cable operator and the subscriber television. RT-VOD requires a fixed amount of locked down guaranteed bandwidth (spectrum) for each instance of each stream of video delivered to the plurality of subscribers. As a very large number of titles are stored on the RT-VOD system, along with a large number of subscribers added to the network, the RT-VOD system will become unwieldy and expensive. The RT-VOD system cannot scale easily to large concurrent subscriber usage. Typical size of RT-VOD storage is in the range of a three (3) to five (5) Terra bytes. Typical RT-VOD system is provisioned to support concurrent usage by ten (10) percent of the subscriber base. If popular new movie releases were to be made available on the RT-VOD system, it is likely that concurrent usage demand from subscribers could not be met by the RT-VOD system architecture. It is also likely that storage demands of all of the non-popular, very occasionally requested videos could not be met cost effectively by the streaming RT-VOD system.

Content providers such as the Hollywood movie studios have been unwilling to release newer and more popular movies into the VOD system. The content providers would like to have a direct interactive relationship with the content consuming subscribers. The content providers would like to directly interact with the subscribers, so they can build an ongoing dynamic personalized relationship with each subscriber, without being intermediated by content aggregators and cable operators. For example, the content providers would like to understand the subscriber preferences and be able to recommend movies of interest, sell associated merchandise, etc. Towards this goal, the major movie studios are attempting direct distribution by downloading of movies from their websites hosted on the Internet to the subscribers connected to the broadband Internet through their personal computers. There are several major drawbacks in this strategy as listed below. (i) The movies reach only personal computers and do not reach televisions. Subscribers would prefer to receive movies on their televisions. (ii) The time to download a typical movie over the Internet at typical current broadband data rate, of say 1 Mbits/sec, is in the range five (5) to eight (8) hours. (iii) The cost of hosting and distributing broadband content on the Internet is prohibitively expensive.

Increasingly digital cable TV set-top boxes 180,185,189, one embodiment of which is the Scientific Atlanta Explorer 8000, are being designed and manufactured with a hard disk on board. The TV set-top box is connected to the Cable network through a DOCSIS cable modem. The TV set-top boxes have the same two-way connectivity to the network as a personal computer connected to a broadband network. The typical size of a hard disk in the TV set-top boxes is 40 Giga Bytes (GB). A typical central cable station 120 services 200,000 homes with 200,000 TV set-top boxes. Thus, aggregate hard disk storage of 8000 Terra-Bytes (8,000,000 Giga Bytes) may be available, distributed in the remote buildings (homes) connected to a typical central cable station.

A heretofore un-addressed need exists in the industry for providing a system and method for making almost unlimited amount of multimedia available on the network for on-demand consumption by paying subscribers in the homes. There is a need to support large concurrent audiences consuming varying multimedia. It is a further object of the present invention to provide a system architecture that allows the content providers to interact directly and personally with the said subscribers. All of the advantages accrued to the distribution of video by the use of the present invention, also applies equally to other type of broadband multimedia such as digital pictures, games, audio etc., video being one of the multimedia.

SUMMARY

Disadvantages associated with the prior art are overcome by the present invention of a method and apparatus for distributing multimedia content (including video) to subscribers attached to the cable network. The multimedia content is processed for optimal storage on storage devices attached to the cable network via a cable modem and distributed in remote buildings (for example, homes). Each request from a subscriber is analyzed to identify the set of optimal storage devices from which the multimedia content should be retrieved to fulfill a subscriber's request.

Specifically, in an interactive content distribution system comprising content provider equipment connected to subscriber (content consumer) equipment via the Internet and a two-way HFC cable network, a method according to the present invention for sourcing the content from the content provider and distributing the said content to the subscriber as per the interests of the content provider, network operator and the subscriber, said method comprising the steps of: defining a relationship between content provider and network operator regarding the distribution of a specific media and the digital rights associated with said media, wherein the constraints of limited bandwidth at the subscriber access network results in the addition of a controller unit to the central cable station, said controller unit having access to network status and storage availability information, said information being used to efficiently store media across the cable network on storage devices, said storage devices being attached to the cable network via cable modems, said cable modems and storage devices being located in remote buildings, said stored media being transferred to requesting subscriber, said requesting subscriber possessing a storage device, said storage device being attached to a cable modem located in a different remote building, said subscriber retrieving the transferred media from the said storage, adhering to the digital rights associated with said media, and consuming said media.

The foregoing and other features, aspects, and advantages of the present invention will become apparent to one skilled in the art upon examination of the following detailed description, when read in conjunction with the accompanying drawings.

Other method embodiments and other apparatus embodiments are described in the detailed description section below. This summary does not purport to define the invention. The claims, and not this summary, define the invention.

BRIEF DESCRIPTION OF THE DRAWINGS

FIG. 3 depicts a sample XML that can be used by the controller unit to distribute media over the network FIG. 3A depicts a sample XML fragment used to carry billing information to Billing systems FIG. 4 provides a diagram of the controller unit and the major software component modules that make up the controller unit FIG. 5 provides a detailed block diagram of the software architecture on a TV set-top box. The lower hardware interface layer, the middleware and application layer are seen. Shown is the client agent integration into the TV set-top box architecture FIG. 6 pictorially depicts the splitting of a file into smaller components and rejoining the components to make whole again

DETAILED DESCRIPTION OF THE PREFERRED EMBODIMENTS

The disadvantages heretofore associated with the prior art are overcome by the present invention of a method and apparatus for delivering broadband multimedia storage (including video) to cable network subscribers. A system according to the invention provides a multimedia storage and distribution system that allows the content provider to reach a mass cable network subscriber audience without the necessity to store the content continuously on a central storage system. Furthermore, the content provider is enabled to maintain a direct interactive personalized relationship with said subscriber audience. The invention additionally allows the subscriber on-demand access to an almost unlimited selection of multimedia stored across the cable network.

Referring to FIG. 1, there is shown an overall diagram of the HFC network. Other than the inventive concept, the elements of FIG. 1 are well known and as such will not be described in detail. The system comprises of a remote web server 105 connected to the Internet 110. An Internet gateway router 124, one embodiment of which is the Cisco GSR 12000, connects the central cable station 120 to the Internet 110. The central cable station 120 is connected to a primary optical fiber link 135 through an Optical transport platform 130, one embodiment of which is the Cisco ONS 15454. The primary optical fiber link 135 is further connected to a plurality of distribution hubs 140,141 through the optical transport platform 130. A cable modem termination system (CMTS) 150 in the distribution hub interfaces to the optical transport platform 130 through an ATM switch (not shown in FIG. 1). Customer premise equipment (CPE) consists of TV set-top boxes 180,185,189, Personal Computers (PC's) 184,187 Cable Modems 160,165,169. The TV set-top boxes and PC's are connected to the cable network through the Cable Modems. The CPE is housed in remote buildings (homes). The CMTS 150 is connected to Fiber Nodes 156,157 via a secondary optical fiber (Analog) 155. The Fiber Node 156 is further connected to the CPE in remote buildings through a coaxial cable 159.

In one embodiment, the content provider, Warner Brothers 100 has web server computer 105 connected to the Internet. The Web Server is accessible with a Uniform Resource Locator (URL) as indicated by www.warner.com. The Web Server computer 105 contains the MPEG2-encoded and encrypted file of the movie "Casablanca". Casablanca has been encrypted with the Network Operator's public key, using the commonly used public key encryption program "Pretty Good Privacy" (PGP). The PGP program and usage information is freely available on the Internet. Associated with the Casablanca MPEG-2 file is a service property file depicted in FIG. 3, also stored on the www-.warner.com web server computer. A designated employee of the cable operator logs into the web site 105, enters a password and downloads the encrypted movie file and the service property file. The Casablanca movie file is downloaded to a download computer in the central cable station 120. The operator enters a private secret key using the PGP software. This results in a decrypted MPEG-2 file being created. The decrypted Casablanca MPEG-2 file, in this example, is 2 Giga Bytes in size. The decrypted Casablanca MPEG2 file is in a format such that it can be played though the use of industry standard MPEG-2 decoder, the likes of which is present in the set-top boxes 180,185,189, an embodiment of which is the Motorola DCT 5200 TV set-top box.

Figure 2:
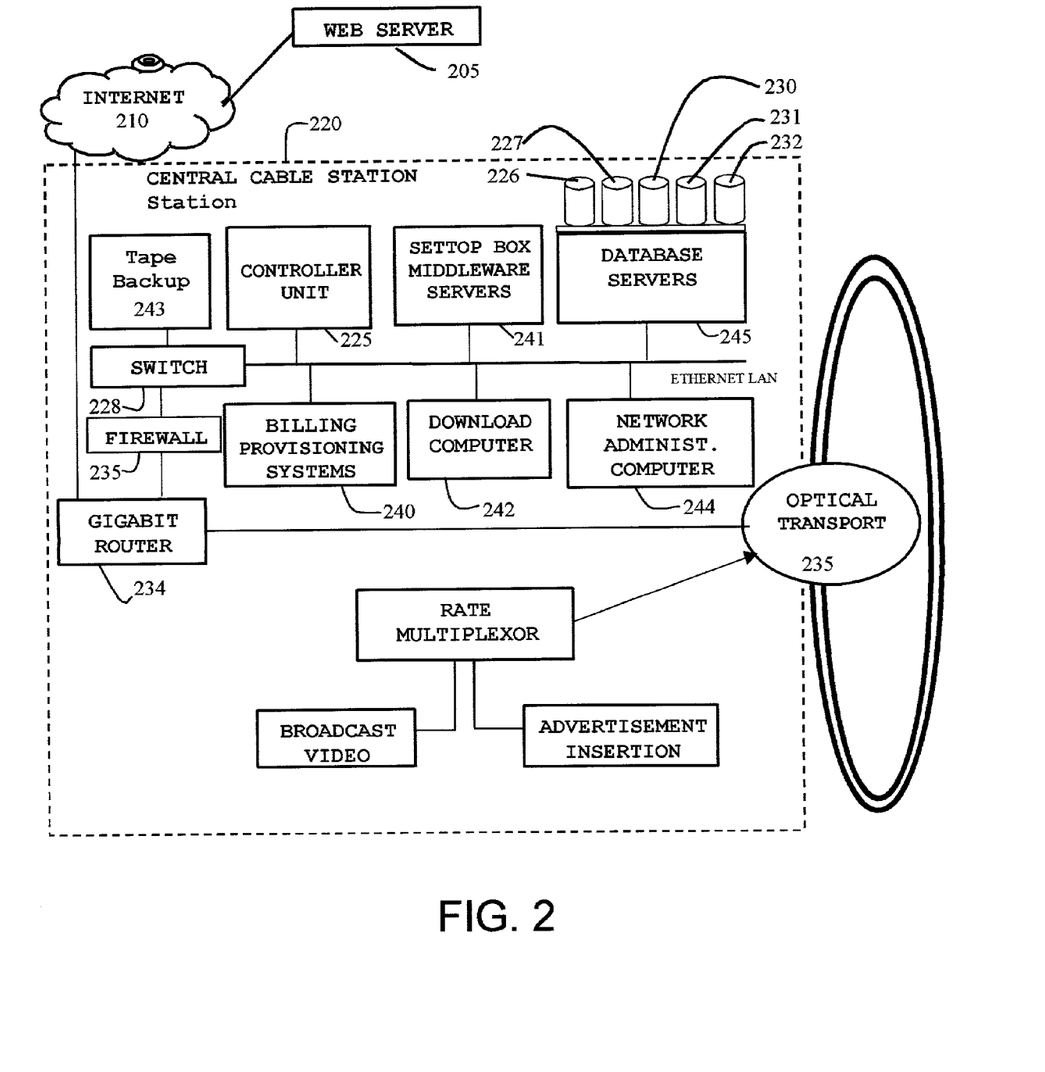
FIG. 2 depicts the central cable station and the component systems contained within. Shown are the various systems that interact with the controller unit to centrally manage the content distribution system

Referring to FIG. 2, this is an exploded view of the central cable station 120 in FIG. 1. The central cable station consists of a controller unit 225, the controller unit being the apparatus of the present invention, Billing and Provisioning systems 240, Set-top box Middleware servers 241, Download Computer 242, Tape Backup system 243, Network Administration computer 244, and the Databases hooked up to the Database Server 245. All of the afore mentioned systems are connected together on a secure private network protected from the external network by a firewall system 235. The databases hooked into this network consist of (i) Media Storage Database (MSD) 226, containing the unprocessed media downloaded from the content provider and the storage map of the processed media. The storage map contains details of the location of every media in the network, where the location indicates the storage devices located in remote buildings (ii) Service Property Database (SPD) 227, containing XML files that indicate in detail the properties for every media available on the network. FIG. 3 shows a sample XML representation of the properties that are associated with a specific media (iii) Client Information Database (CID) 230, containing detailed current information about a client device. An example of a client device is a set-top box 180 (FIG. 1) located in a remote building. The CID contains the makeup and capabilities of the client device 180. Examples of CID information include the type of media handled by the set-top box (MPEG-4, MPEG-2, AVI, MP3, etc.), rendering capability of the set-top box (HTML 4.0, Table support, etc.), current hard disk storage status including allocations and availability, etc. (iv) User/Usage information database (UID) 231, containing general user demographic and usage information. Examples of demographic information include name, gender, age, location etc. Examples of usage include the types of TV shows most watched. An embodiment of usage database creation is the Imprint product from Liberate Technologies (v) Network Information database (NID) 232, stores authorization, service level and connection statistics of all of the subscribers on the network. Connection statistics may include the amount of data transmitted, length of the connection, bandwidth of the connection, the amount of data rejected and other such parametric data.

In continuing the description of the embodiment started in paragraph 0037, the Casablanca MPEG2 movie file is imported into the Media Storage Database (MSD) 226 from the Download computer 242. External files can be imported into a database using readily available database tools, an embodiment of which is Oracle Intermedia services. Oracle InterMedia Audio, Image, and Video User's Guide and Reference from Oracle Corporation provides further instructions. The service property (XML) associated with Casablanca is shown in FIG. 3. This service property is indexed and stored in a Service Property Database (SPD) 226.

With respect to FIG. 2., the movie Casablanca is retrieved from the Media Storage Database 226 by the controller unit 225 for media processing. Media Processing includes splitting the movie Casablanca into several pieces and deciding where on the network to store each of the resulting pieces. Splitting of a file involves breaking the whole file into sub components, such that said sub components can be put back together to result in an exact replica of the original file. Splitting of the file is accomplished by means of an utility similar to the commonly available "split" program on unix computer systems. The controller unit will utilize input data from the databases described afore, namely SPD, CID, UID and NID to compute the variables of splitting and storage. The controller unit will compute the following variables (i) number of pieces to split Casablanca into (ii) the size of each piece (iii) the number of copies of each piece to replicate for redundant storage (iv) the location of storage for each piece. The most popular of movies indicated by their priority level in the service property are maintained as a singular piece and stored in every set-top box. As the levels of popularity decrease, the media is stored less redundantly on storage devices distributed across the network. A very rarely watched movie may result in just one copy of its subcomponent pieces being stored on storage devices distributed across the network. The popularity of the movie may be determined prior and indicated as a field in the Service property for the media 315, FIG. 3.

At this point, in order to facilitate understanding of the inventive concept, reference should be made back to FIG. 1. In the present example, the Casablanca movie file is split into two (2) pieces of equal size, piece 1 and piece 2. Each piece is 1 Giga Byte in size. The controller unit 125 computes the optimal storage location for piece 1, is on the hard disk 175 in the set-top box (B) 185. The controller unit computes the optimal storage location for piece 2, is on the hard disk 179 in the set-top box (C) 189.

Figure 5:
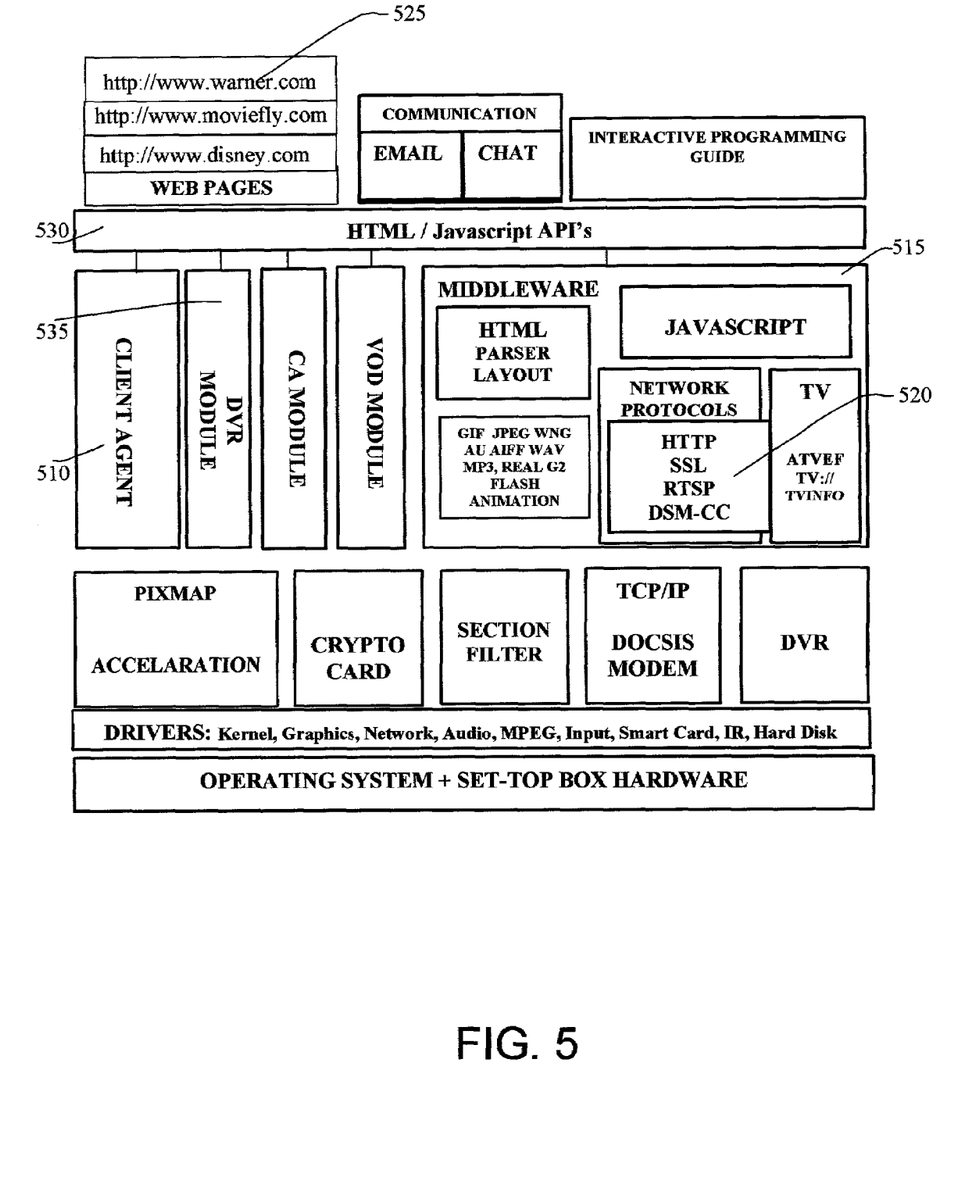

Referring to FIG. 5. A software module present in the set-top box is called the client agent 510. The client agent executes (runs) on the set-top box. The controller unit communicates with the client agent in the set-top box using sockets based on the TCP/IP or UDP/IP protocol. The client agent in a set-top box will communicate with peer client agents in other set-top boxes using sockets based on TCP/IP or UDP/IP protocol. An unique IP address is associated with the controller unit. Similarly a unique IP address is associated with the cable modem that the set-top box interfaces to. TCP/IP sockets are a well-understood means of network communication, in the art and are not discussed further herein. In addition to a unique Internet Protocol address, each set-top box may have other associated unique identity such as a Media Access Control address, set-top box receiver ID, smart card ID, etc.

Referring back to FIG. 1, the controller unit makes a call through a TCP/IP session to the client agent in set-top box (B) 185 to start a storage transfer of piece 1 from the central cable station 120. The client agent on set-top box (B) reserves 1 GB of storage space on hard disk 175 and then spawns a thread to initiate transfer of piece 1 from the controller unit to the storage device 175. The client agent in set-top box (B) 185 sends a response back to the controller unit once the transfer is completed indicating success.

The controller unit makes a call through a TCP/IP session to the client agent in set-top box (C) 189 to start a storage transfer of piece 2 from the central cable station 120. The client agent on set-top box (C) reserves 1 GB of storage space on hard disk 179 and then spawns a thread to initiate transfer of piece 2 from the controller unit to the storage device 179. The client agent in set-top box (C) 189 sends a response back to the controller unit once the transfer is completed indicating success.

On completion of the storage transfer of piece 1 and storage transfer of piece 2 from the controller unit to the remote storage devices 175,179, the controller unit 125 will update the logical to physical mapping indicated by the storage map for Casablanca. The storage map indicates piece 1 of Casablanca is on a hard disk 175 on set-top box (B) 185 and piece 2 of Casablanca is on a hard disk 179 on set-top box (C) 189. The storage map is stored on the Media Storage Database in the central cable station 120. The original MPEG-2 file of Casablanca is now backed up in a tape backup system and may be deleted from the Media Storage database, to make room for newer media.

Continuing with the Casablanca example, a subscriber is located in a remote building containing a cable modem 160 and a set-top box (A) 180. This subscriber turns on the Television set and tunes to a channel with the remote control. Prior art allows mapping of channels to web pages/address. A specific channel has been associated with web page from Warner Brothers, the owner of the movie Casablanca. In the current example channel 191 is mapped to www.warner.com.

Refrring to FIG. 5, when the user changes the channel to number 191, the set-top box consisting of a web browser middleware 515, will make a "http" 520 request for the web page from the web server addressed by www.warner.com. The Warner Brothers web page is displayed on the subscriber's television set. On the web page is a link indicated by a button that allows the subscriber to buy the movie Casablanca from Warner brothers. Using an input device such as a remote control or a keyboard, the subscriber clicks on the "buy" Casablanca link. A dialog box is presented to the user on the TV screen indicating a charge of four (4) Dollars to watch the movie. The subscriber indicates acceptance of the charge by pressing another button displayed on the TV screen. The Warner Brothers web page is written using the Internet standard HTML and Javascript language. This web page is processed by the set top box middleware 515 for display on the Television screen. The Warner Brothers web page 525 makes a Javascript call 530 into the client agent software module in the set-top box indicating the name of the movie and the amount the subscriber is to be charged— fetchMovie ("Casablanca", 4.00). The client agent 510 in the set-top box receives the call and will start to process the transaction, which involves setting up and completing the transfer of the movie file Casablanca to hard disk storage in the requesting set-top box.

Referring back to FIG. 1, the controller unit 125 retrieves the storage map for Casablanca from the Media Storage Database (MSD). The controller unit sends a message to the client agent on set-top box (A) 180 to reserve 2 GB of hard disk space to receive Casablanca and start the transaction. The client agent in set-top box (A) 180 reserves 2 Giga Bytes of hard disk space. The client agent in set-top box (A) 180 will next do a Dynamic Service Add (DSA) through the cable modem to the CMTS 150 to allocate the maximum downstream bandwidth available to a new service flow. The service flow associated with the client agent, in this example, is allocated 6 Mega bits per second of downstream bandwidth by the CMTS 150. A message is sent from the client agent in set-top box (A) 180 to the controller unit 125 indicating 6 Mega bits per second of downstream bandwidth has been reserved. The controller unit schedules piece 1 for transfer to hard disk storage 170 in the set-top box (A) 180. The controller unit 125 next sends a message to the client agent on set-top box (B) 185 to allocate upstream bandwidth. The client agent on set-top box (B) 185 will do a Dynamic Service Add (DSA) through the cable modem to the CMTS 150, to allocate the maximum allowable upstream bandwidth to a new service flow. The service flow associated with the client agent on set-top box (B) 185, in this example, is allocated 3 Mega bits per second of upstream bandwidth by the CMTS 150. A message is sent from the client agent on set-top box (B) 185 to the controller unit 125 indicating 3 Mega bits per second of upstream bandwidth reserved. The controller unit 125 computes that an additional 3 Mega bits per second of upstream is necessary to fill the total 6 Mega bits per second downstream available to set-top box (A) 180. The controller unit 125 identifies set-top box (C) 189 as the location of piece 2 of Casablanca. The controller unit next sends a message to the client agent on set-top box (C) 189 to allocate upstream bandwidth. The client agent on set-top box (C) 189 will do a Dynamic Service Add (DSA) through the cable modem to the CMTS 151, to allocate the maximum upstream bandwidth allowable to a new service flow. The service flow associated with the client agent on set-top box (C) 189, in this example, is allocated 3 Mega bits per second of upstream bandwidth by the CMTS 151. A message is sent from the client agent on set-top box (C) 189 to the controller unit 125 indicating 3 Mega bits per second of upstream bandwidth reserved. Three (3) Mega bits per second from sender set-top box (B) 185 and three (3) Mega bits per second from sender set-top box (C) 189 will fill the six (6) Mega bits per second of downstream available to receiver set-top (A) 180. The transfers are balanced and ready to go.

The controller unit sends a message to set-top box (A) 180 to begin transfers from set-top box (B) 185 for piece 1 of Casablanca and from set-top box (C) 189 for piece 2 of Casablanca. The set-top box (A) 180 will spawn one transfer thread to start the transfer of piece 1 of Casablanca and then spawn another thread to start the transfer of piece 2. A thread is a single sequential flow of control within a program. In this example, both threads are running concurrently while piece 1 and piece 2 of Casablanca are being transferred simultaneously.

At 6 Mega bits per second, the entire movie Casablanca, 2 Giga Bytes in size is transferred in about 45 minutes. On completion of transfer, the client agent in set-top box (A) 180 presents an indication on the television screen to the subscriber suggesting that the movie Casablanca is now ready to watch. The indication could take the form of a small green indicator button on a corner of the television screen. The user is able to navigate to the button using an input device such as a remote control or a keyboard. On pressing the button, the client agent transfers control of the media to the Digital video recorder in the cable set-top box. The DVR module 535 is shown in FIG. 5. One embodiment of the DVR module is the Liberate Technologies Middleware running on a Scientific Atlanta Explorer 8000. Digital video recorders are an established technology and are not discussed in detail. The subscriber is now able to watch the movie Casablanca with full media controls such as pause, stop, fast-forward, rewind, etc.

On completion of transfer of the movie Casablanca, the client agent in set-top box (A) 180 sends a message to the controller unit 125 indicating completion of transfer and beginning of use of the movie Casablanca by the subscriber. The controller unit 125 updates the storage map to indicate presence of piece 1 and piece 2 of Casablanca on set-top box (A) 180.

Figure 3A:
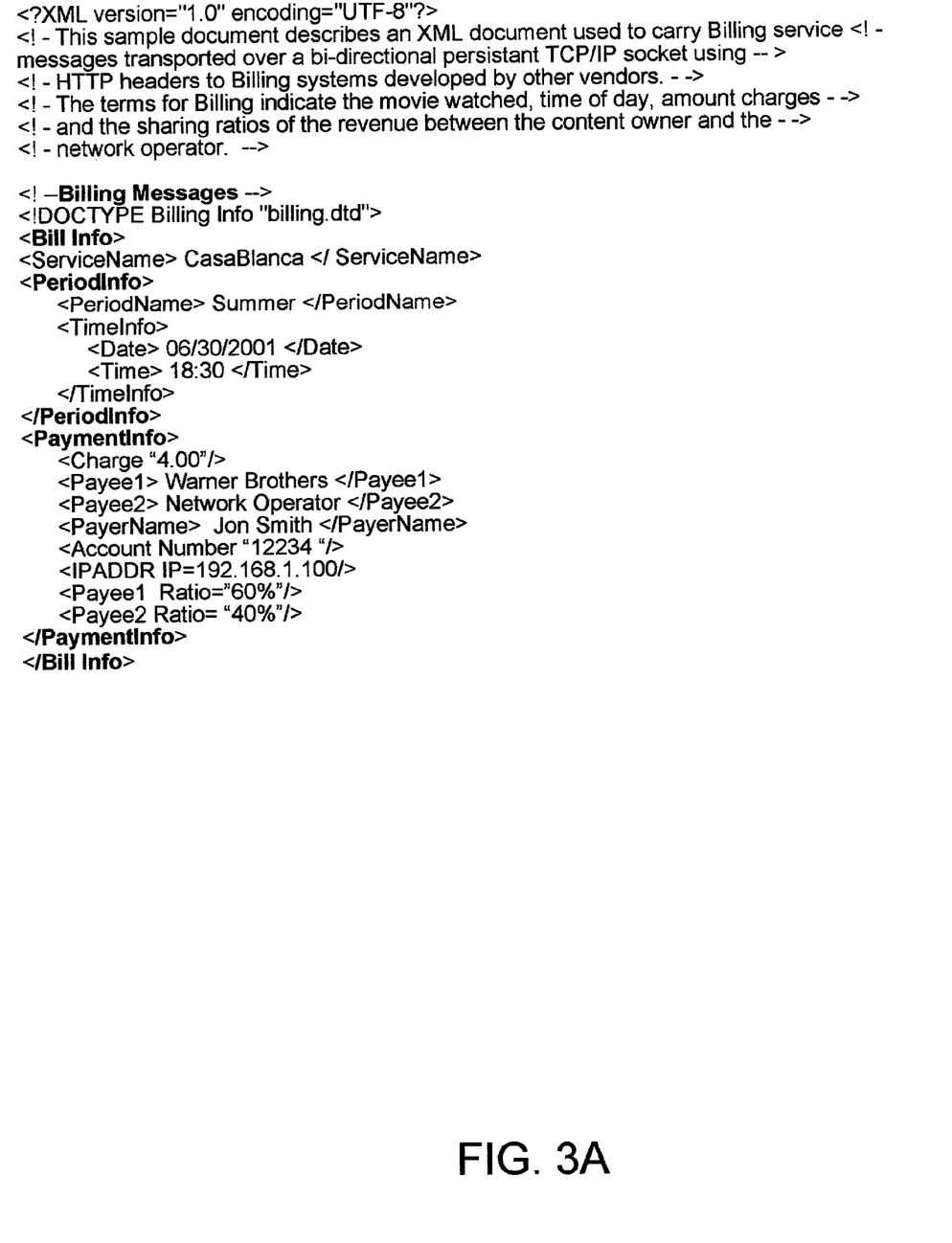

Referring to FIG. 3A, the controller unit 125 will carry the billing service message through a XML API over a bi-directional persistent TCP/IP socket. Billing service messages are transported over HTTP headers. The Billing Service message for set-top box (A) 180 indicates the movie watched, time of day, amount to be billed and the sharing ratio of the revenue between the network operator and the content owner. Some embodiments of the Billing systems the controller unit interfaces with are CSG, Convergys, and CableData/DST. The Billing information is encapsulated in XML with specific billing vendor requirement.

Figure 6:
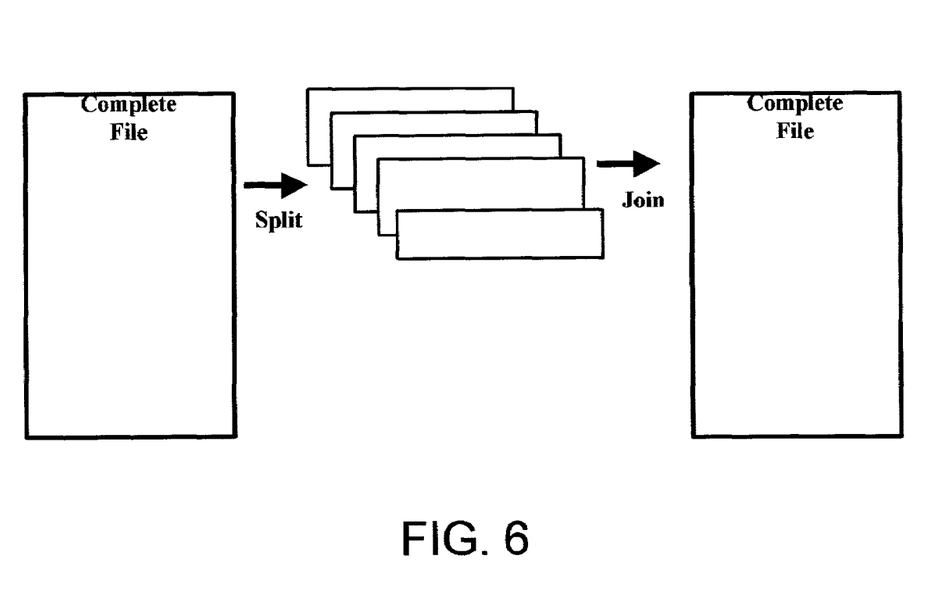

According to the present invention, a multimedia file may or may not be stored wholly as a single entity at the storage destination. A large file is likely to be split into many pieces, using a utility commonly available on unix systems called "split". The split pieces are stored across the network with each piece being stored at a different storage device 170, 175,179. For purposes of redundancy each singular piece is replicated and stored in a plurality of locations. The "split" operation as depicted in FIG. 6 is non-lossy and the exact replica of the original is recreated by combining the split pieces.

Furthermore, the present invention relates to finding and delivering any media stored across the cable network, to any set-top box 160,165,169 on the cable network. The various media pieces may be stored across a plurality of nodes on the cable network. The controller unit 125 in the central cable station 120 will identify the location of the various pieces that make up the complete file. Referring to FIG. 2, the controller unit 225 will then access statistics about the current state of the network from the Network Administration Computer 244, to map the most efficient or least cost path to transfer each piece to the requesting node. Refrrring back to FIG. 1, once the transfer map has been constructed, the controller unit 125 issues instructions to the receiving TV set-top box 180 to lock down the required disk space for the incoming media. The client agent in the receiving TV set-top box 180 initiates transfers from the client agents in the sender TV set-top boxes 185,189. Once the minimum requisite pieces are in the storage 170 of the receiving TV set-top box 180, the requesting subscriber can consume the media (play the movie) in a substantially contiguous manner.

In a HFC cable network environment, the bandwidth available on the network is asymmetric. While the maximum downstream bandwidth at a Fiber Node 156 is greater than 27 Mbps, the maximum up stream bandwidth is between 3 Mbps and 10 Mbps. The asymmetrical upstream and downstream data rates are typically shared by 400 homes. The downstream bandwidth could potentially burst to 10 Mbps or greater for each individual set-top box. The upstream bandwidth is the more precious resource and is likely to be constrained to less than 1 Mbps burst by the cable operator. Even as new techniques to increase bandwidth are deployed, the asymmetric-ness of the downstream to upstream data rates will likely remain. The present invention splits the large media files into many pieces for distributed storage 170,175,179 at the nodes. When a transfer is initiated, the split (smaller) pieces travel over the slower upstream links. All of the smaller files in aggregate making up the complete larger file travel on the faster downstream, during the same interval. Thus large file transfers across an asymmetrical network is optimized such that the subscriber enjoys the service at near the maximum capacity of the downstream link, instead of being limited by the unacceptably slow speeds of upstream links. To illustrate one of the benefits of the present invention, consider a typical movie MPEG-2 file that is 2 Giga Bytes in size. The controller unit 125 splits this file into 30 pieces of 66 MB each. The thirty splits are dispersed and stored across numerous set-top boxes. If a set-top box requests the entire file for viewing, the transfer is setup from the various set-top boxes holding the required pieces. If the average allocable downstream bandwidth for the receiving TV set-top box is 7 M bits/second and the average allocable upstream bandwidth is 1 M bit/second. Pieces 1 through 10 are scheduled for simultaneous transfer from 10 set-top boxes. Each piece is transferred in under 10 minutes at 1 M bit/second. The same operation is repeated for pieces 11 through 20 and then for pieces 20 through 30. The whole movie is transferred in under 45 minutes. This compares favorably with the unmanaged over the Internet downloads with average download speeds of 1 Mbit/second, resulting in a download time of over 5 hours for the same 2 Giga Byte file.

Another benefit of the present invention to the distributed storage of the multimedia is that when the content is split into many pieces and redundantly stored across many set-top boxes, the sender set-top box is not transferring large media files continuously. Thus, only the receiver set-top boxes in a transaction will be busy for extended periods of time. This makes the transaction more acceptable to the sender, who does not directly benefit from the said transaction.

A principal object of the present invention is to provide a method for the content owners who introduce their media on to the distributed cable network to be able to maintain a direct relationship with the cable subscribers through a web page presentation. The content owner can directly promote and sell the content to the subscriber without having to host and deliver the content. The content owner has all the benefits, but without the prohibitive cost of owning and managing large server computers.

Figure 7:
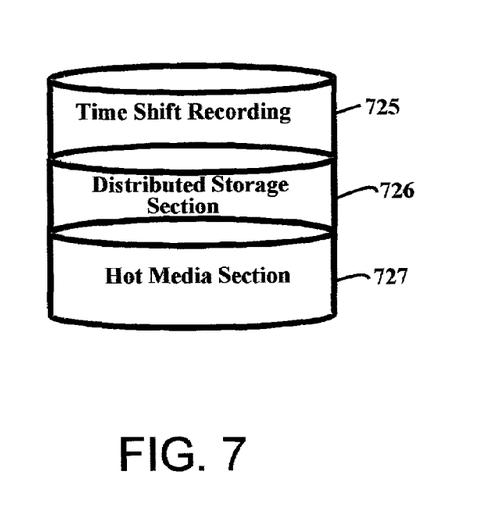
FIG. 7 depicts the partitioning of a hard disk drive in a cable TV set-top box into three sections. Each section is reserved for a different mode of operation

The present invention also relates to managing media that is not part of distributed storage. The hard disk in the TV set-top box is partitioned into three sections as depicted in FIG. 7. The first partition 725 is intended for recording TV broadcast programming. The second partition 726 is the Distributed Storage section, where the split pieces of large media files are stored. The third section 727 is marked as a hot media section. The hot media section holds the complete whole media files. These files are not split. Highly popular movies are downloaded into the hot media section as complete files in the TV set-top box devices, using the IGMP multicast protocol. These movies are available to the subscriber instantly on demand without having to fetch the file from other set-top boxes.

Figure 4:
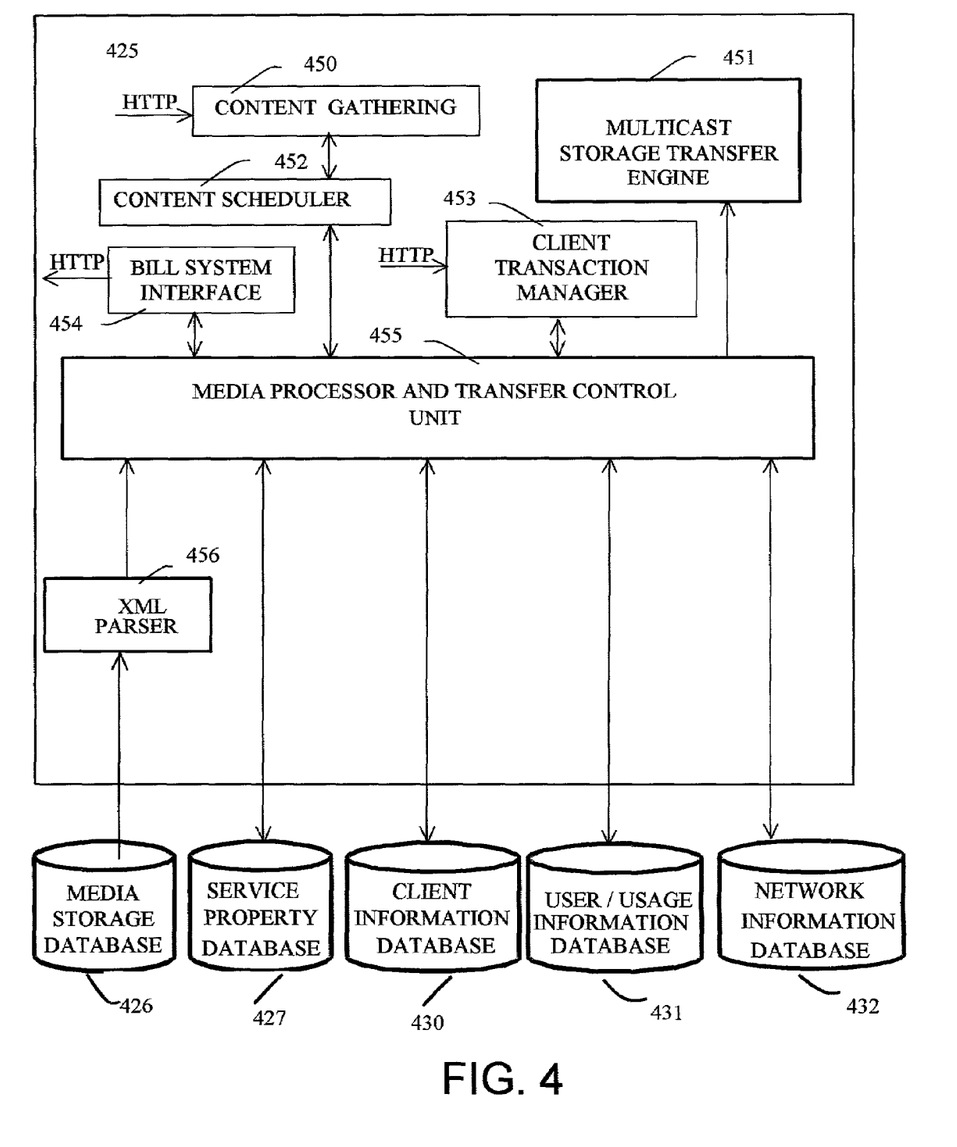

Referring to FIG. 4, the present invention also provides centralized control of the services. All subscriber transactions and requests for multimedia content are centrally managed through the controller unit 125. This reduces the possibilities of widespread theft of intellectual property of the content owners. The Service property, an embodiment of which is shown in FIG. 3, describes all of the digital rights and distribution rights of the associated media. The service property indicating an agreement between the content owner and the cable operator is entered into the Service property database 427 shown in FIG. 4. Commonly used Database entry tools are employed for this purpose. The Media processor and Transfer control unit 455 parses the XML fragment depicted in FIG. 3. The XML fragment conforms to a standard format as understood by the error checking XML parser 456. On parsing the XML file, tokens are generated indicating a number of (attribute, value) pairs. These attributes and their associated values will detail the action to take in delivering the media for consumption, by subscribers attached to the cable network.

The present invention is related to the management of large media files that are part of a broadband service. In addition to video files, the method and apparatus embodied in the present invention is used to store and deliver digital games, image files, music and other digital media.

In accordance with another embodiment, IP multicasting is used as a broadcast mechanism to implement a data carousel of digital files. A rotating sequence of data files is IP multicast from a central cable station to a plurality of distribution hubs. There is one multicast stream flowing from the central cable station to each distribution hub such that multiple digital files are flowing in a rotating sequence in the stream to the distribution hub. A set-top box is coupled to the distribution hub via a coaxial portion of the cable network. In one aspect, a client agent in a set-top box joins the multicast stream being received at the local distribution hub such that the set-top box receives a digital file of the user's (user of the set-top box) preference. In a second aspect, the usage history of the user of the set-top box is analyzed to determine which of the digital files of the stream to receive such that a digital file the user is likely to want to access in the future will be stored beforehand in the hot media section of the set-top box.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   (a) splitting a video file into a first piece and a second piece, the video file being a digital representation of a video;
   (b) moving the first piece through a cable network to a first building and storing the first piece in the first building on a first storage device, wherein the first storage device is disposed in a first set-top box;
   (c) moving the second piece through the cable network to a second building and storing the second piece in the second building on a second storage device, wherein the second storage device is disposed in a second set-top box;
   (d) moving the first piece from the first storage device through the cable network and into a third building, and storing the first piece in the third building on a third storage device, wherein the third storage device is disposed in a third set-top box;
   (e) moving the second piece from the second storage device through the cable network and into the third building, and storing the second piece in the third building on the third storage device; and
   (f) retrieving and displaying the first piece from the third storage device and substantially contiguously retrieving and displaying the second piece from the third storage device such that the video is displayed in the third building as a single unit.

2. The method of claim 1, wherein the splitting of (a) occurs in a central cable station.

3. The method of claim 1, wherein the splitting of (a) occurs in a distribution hub.

4. The method of claim 1, wherein the splitting of (a) is performed by a content provider, and wherein after the splitting of (a) the first piece and the second piece are supplied to a central cable station.

5. The method of claim 1, wherein the video file is an MPEG file.

6. The method of claim 1, wherein the cable network includes: a distribution hub, a first fiber node, a second fiber node, a primary fiber optic network coupled to the distribution hub, a first secondary fiber optic network coupled to the distribution hub and to the first fiber node, a second secondary fiber optic network coupled to the distribution hub and to the second fiber node, a first tertiary network coupled to the first fiber node and extending to the first building and to the second building, and a second tertiary network coupled to the second fiber node and extending to the third building.

7. The method of claim 1, wherein the first storage device is a first hard disk disposed in the first TV set-top box, and wherein the second storage device is a second hard disk disposed in the second TV set-top box, and wherein the third storage device is a third hard disk disposed in the third TV set-top box.

8. The method of claim 1, wherein the first storage device is a first memory disposed in the first TV set-top box, and wherein the second storage device is a second memory disposed in the second TV set-top box, and wherein the third storage device is a third memory disposed in the third TV set-top box.

9. The method of claim 1, wherein the moving of (d) and the moving of (e) occur substantially simultaneously.

10. The method of claim 1, wherein the video is displayed in (f) in the third building on a television screen.

11. The method of claim 1, wherein the first piece moves from the first storage device in (d) with a first data rate DR1, wherein the second piece moves from the second storage device in (e) with a second data rate DR2, wherein the first and second pieces move into the third storage device in (d) and (e) with a combined data rate CDR, and wherein CDR is equal to or greater than the sum of DR1 and DR2.

12. The method of claim 1, further comprising:
   (g) determining a downstream available bandwidth into the third storage device; and
   (h) determining a first upstream available bandwidth out of the first storage device and determining a second upstream available bandwidth out of the second storage device; and
   (i) based at least in part on (g) and (h), determining how the first an second pieces of the video file will move through the cable network to the third storage device.

13. The method of claim 12, wherein the first piece moves from the first storage device in (d) with a first data rate DR1, wherein the second piece moves from the second storage device in (e) with a second data rate DR2, and wherein the sum of DR1 and DR2 is approximately equal to the downstream available bandwidth determined in (g).

14. The method of claim 1, further comprising:
   (g) viewing a web page on a television screen in the third building;
   (h) selecting a link on the web page, the link being indicative of the video; and
   (i) in response to the selecting of the link, initiating the moving of (d) and (e).

15. A method, comprising:
   (a) splitting a multimedia file into a first piece and a second piece, the multimedia file being a digital representation of a multimedia content, wherein the multimedia content includes information taken from the group consisting of: an amount of video, a game, an amount of music, a picture;
   (b) moving the first piece through a cable television network to a first building and storing the first piece in the first building on a first set-top box;
   (c) moving the second piece through the cable television network to a second building and storing the second piece in the second building on a second set-top box;
   (d) selecting a link, wherein the link is indicative of the multimedia content;
   (e) in response to the selecting of (d) moving the first piece from the first storage device through the cable television network and into a third building, and storing the first piece in the third building on a third set-top box;
   (f) in response to the selecting of (d) moving the second piece from the second storage device through the cable television network and into the third building, and storing the second piece in the third building on the third set-top box; and
   (g) retrieving the first and second pieces from the third set-top box and playing back or playing the first and second pieces in the third building as a single amount of multimedia content.

16. The method of claim 15, wherein the cable television network and the first and second and third set-top boxes form a storage area network, and wherein the single amount of multimedia content is played back or played on a wireless device having a screen.

17. The method of claim 15, wherein the first, second and third set-top boxes are coupled together via the cable television network so that the first, second and third set-top boxes form a storage area network, the storage area network further comprising a central controller, the central controller maintaining a map of where the multimedia content is stored in the storage area network.

18. The method of claim 15, wherein the cable television network is a cable IP network.

19. The method of claim 15, further comprising:
viewing a page on a television screen in the third building;
selecting a link on the page, the link being indicative of the multimedia content; and
in response to the selecting of the link, initiating the moving of (e) and (f), wherein the first piece and second piece are played back or played in (g) by being displayed on the television screen.

20. The method of claim 19, wherein the page is served by a central controller, the central controller maintaining a map of where the multimedia content is stored on the first, second and third set-top boxes.

21. The method of claim 15, further comprising:
viewing a page on a screen in the third building;
selecting a link on the page, the link being indicative of the multimedia content; and
in response to the selecting of the link, initiating the moving of (e) and (f), wherein the first piece and second piece are played back or played in (g) by being displayed on the screen.

* * * * *